(12) United States Patent
Tyner et al.

(10) Patent No.: US 6,272,618 B1
(45) Date of Patent: Aug. 7, 2001

(54) SYSTEM AND METHOD FOR HANDLING INTERRUPTS IN A MULTI-PROCESSOR COMPUTER

(75) Inventors: Benjamen G. Tyner; Mark Larson, both of Austin, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/275,826

(22) Filed: Mar. 25, 1999

(51) Int. Cl.[7] ............................... G06F 9/48; G06F 13/24
(52) U.S. Cl. ...................... 712/31; 710/264; 710/267; 712/30; 712/40; 709/102; 709/106
(58) Field of Search ........................... 710/123, 128, 710/266.2, 260, 264, 48, 258, 267, 266, 268; 779/446, 426, 454, 455; 709/102, 106, 101, 153; 712/234.4, 31, 30, 34, 234; 708/131; 737/80, 487

(56) References Cited

U.S. PATENT DOCUMENTS

| | | | |
|---|---|---|---|
| 4,523,297 | * 6/1985 | Ugon et al. | 708/131 |
| 5,193,157 | 3/1993 | Barbour et al. | 712/234 |
| 5,346,656 | 9/1994 | Kaneko et al. | 709/102 |
| 5,359,715 | 10/1994 | Heil et al. | 710/128 |
| 5,428,794 | 6/1995 | Williams et al. | 710/268 |
| 5,495,615 | 2/1996 | Nizar et al. | 710/260 |
| 5,568,649 | 10/1996 | MacDonald et al. | 379/455 |
| 5,613,128 | * 3/1997 | Nizar et al. | 910/264 |
| 5,696,976 | 12/1997 | Nizar et al. | 710/266 |

* cited by examiner

Primary Examiner—Daniel H. Pan
(74) Attorney, Agent, or Firm—Haynes and Boone, L.L.P.

(57) ABSTRACT

A system and method for handling system management interrupts in a multi-processor computer is disclosed. When the computer enters system management mode, the method uses the registers of each processor to get currently executing opcode to determine what each processor was doing before the interrupt. The method may have to first translate address information to locate the actual physical location of the currently executing opcode. The registers are stored in memory and the contents of the registers can be used to determine if the current processor caused the system management interrupt. If so, then the method now knows which processor caused the interrupt and can handle the interrupt accordingly. If, however, the processor was not the one that caused the interrupt, or if another processor also caused an interrupt, the method then repeats the above steps for the next processor of the multiprocessor system.

17 Claims, 2 Drawing Sheets

SYSTEM AND METHOD FOR HANDLING INTERRUPTS IN A MULTI-PROCESSOR COMPUTER

TECHNICAL FIELD

One embodiment relates generally to computers and, more particularly, to a interrupt handling technique for a multi-processor computer.

BACKGROUND

Most computers can support various components and devices that comprise or interface with the computer in a variety of different ways. These components and devices must be supported by different software programs and operating environments running in the computer.

For example, a personal computer may connect to peripheral devices through one or more peripheral buses or ports. Examples of popular peripheral buses include a universal serial bus ("USB") or an IEEE 1394 serial bus ("1394 bus"). The USB is a two-wire serial personal computer bus, designed by a consortium of computer makers and suppliers, which can support many peripheral devices either in parallel or in a daisy chain configuration. The 1394 bus is also a two-wire serial personal computer bus, very similar to the USB. Specifications for the 1394 bus are available from the Institute of Electrical and Electronics Engineers, Inc. ("IEEE"), 345 East 47th Street, New York, N.Y. 10017-2394. For both the USB and the 1394 bus, when a device is connected to the bus, it provides a predetermined code that identifies its type and bandwidth requirements.

Problems occur when a computer implements an operating environment that is not aware of a specific type (e.g., does not provide appropriate device drivers) of device. To resolve these problems, the computer must implement device support outside of the operating environment. For example, if a computer uses a USB port for a USB keyboard while implementing a PS/2 operating environment (a PS/2 operating environment expects a PS/2 type keyboard), the computer's basic input/output system ("BIOS") can intercept data and software access to and from specific ports associated with the keyboard. The BIOS thereby "translates" the commands between the newer USB keyboard and the operating environment for use with older (or "legacy") keyboards by examining the internal processor ports and registers and "routing" data accordingly.

Continuing with the present example, if the processor writes a data value to port 60$h$ (60 hexadecimal, which is a port defined for use by a PS/2 keyboard), the write instruction causes a system management interrupt ("SMI") trap. In response to the SMI trap, the BIOS instructs the processor to enter a system management mode. The BIOS then places the appropriate data in the processor's registers.

Similarly, the BIOS can be interrupted in order to be requested to go into standby mode. In order to determine what the BIOS was interrupted for, the BIOS must inspect the software instructions. The BIOS relies on data stored in the processor registers to determine this. The BIOS should then retrieve the appropriate data out of the processor's registers to make a decision or perform an action.

However, the BIOS may be interrupted for several reasons and may not be able to determine the reason from the hardware or the interrupt alone. A problem exists when the computer has multiple processors. In these computers, the BIOS has no way to know which of the processors in the multiprocessor system initiated the request. In the above-described examples, the BIOS must determine which of the processors instruction execution caused the interrupt to properly route the data to or from the USB keyboard.

Therefore, what is needed is a system and method for handling system management interrupts in a multiprocessor computer.

SUMMARY

In response to the aforementioned problems, a technical advance is achieved by a system and method for handling interrupts in a multiprocessor computer. In one embodiment, the method handles one or more system management interrupts caused by one or more of the processors in the multiprocessor computer system. When a system management interrupt occurs, the computer enters system management mode and the processors store the contents of their registers in memory. The method checks the register contents stored in memory to find the actual physical location of desired data such as an opcode. The method fetches and examines the opcode indicated by the register contents. If the opcode is of the type that would cause a system management interrupt, such as a read or write to port 60$h$ (hexadecimal) or 64 h, this indicates that the current processor is the one to receive the interrupt.

The opcodes may be read or write operations to ports that are not currently being used by existing components. For example, PS/2 keyboards often use ports 60$h$ and 64 h for read and write operations. If the computer is running a program that only supports PS/2 keyboards, yet the computer itself has a USB keyboard, then the computer must translate and route data to the appropriate processor registers for the accesses to and from these ports.

In some embodiments, relative addressing is used by one or more of the processors. As a result, the method must also translate the relative address to an actual physical address in order to locate an operating instruction indicated by the register.

DESCRIPTION OF A PREFERRED EMBODIMENT

Figure 1:
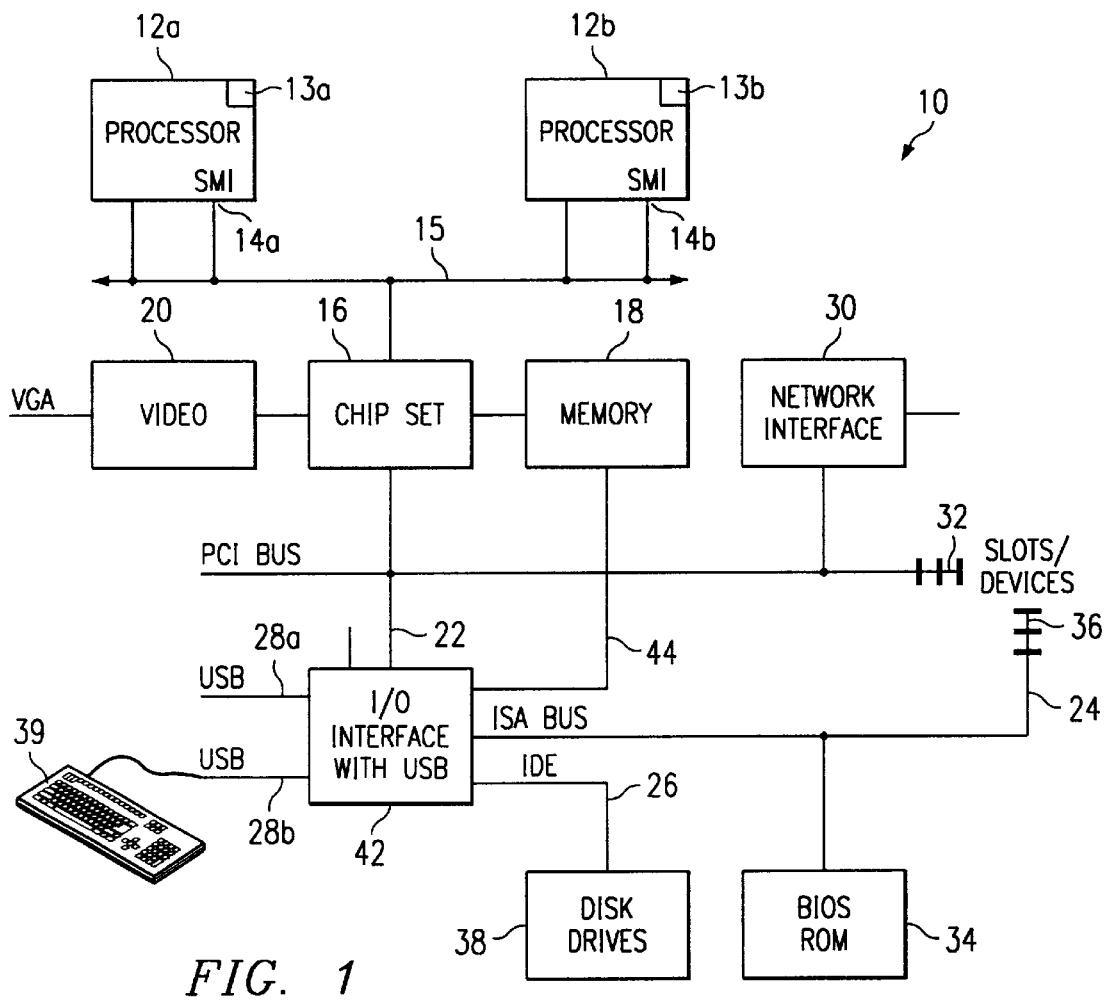
FIG. 1 provides a block diagram of one embodiment of a multiprocessor computer.

Referring to FIG. 1, the reference numeral 10 designates, in general, a computer for implementing several different embodiments. The computer 10 is illustrated with many different components, it being understood that many of the components may be used by some embodiments and not by other embodiments. Actual component types are also discussed for the sake of example, it being further understood that a wide variety of substitution is expected for different embodiments.

The computer 10 includes two processors 12$a$, 12$b$, which may for example be Pentium II processors from Intel, Corp. of Santa Clara, Calif. and capable of supporting an operating system such as Windows NT 4.0 from Microsoft Corporation of Redmond, Wash. The processors 12$a$, 12$b$ each include a plurality of internal registers 13$a$, 13$b$ and interrupts 14$a$, 14$b$, respectively, including a system management interrupt ("SMI"). The processors 12$a$, 12$b$ each connect to a local bus 15 for accessing one or more components, including a chipset 16. The chipset 16 serves as an interface for accessing other components such as a main memory 18 and a video card 20.

The chipset 16 may, for example, be a 440 BX chipset produced by Intel, Corp., and the main memory 18 may be a single shared memory. Alternatively, the memory 18 may be segregated for each processor. The chipset 16 further interconnects the local bus 15, the video card 20, and the memory 18 with one or more peripheral buses, such as a PCI bus 22. The PCI bus 22, in turn, further connects with an industry standard architecture ("ISA") bus 24, an integrated drive electronics ("IDE") bus 26, and USBs 28a, 28b as described in greater detail below.

The PCI bus 22 connects to one or more peripheral devices, such as a network interface card 30, and may connect to even more devices through one or more PCI ports 32. Similarly, the ISA bus 24 connects to one or more peripheral devices, such as a storage of basic input/output system ("BIOS") code 34 and may connect to even more devices through one or more ISA ports 36. The IDE bus 26 also connects to one or more peripheral devices, such as a hard disk drive 38. The USBs 28a, 28b may connect to any number of components, such as a USB keyboard 29, through one or more of the ports 40a, 40b, respectively.

The USBs 28a, 28b connect with the PCI bus 22 through an interface 42. In the present example, the interface 42 is an I/O Peripheral Controller from Intel, Corp. The interface 42 performs many I/O functions such as interfacing the PCI bus 22 to the IDE bus 26, the USBs 28a, 28b, and the ISA bus 24. The interface 42 may also connect to the main memory 18 through a system management bus 44. In some embodiments, the interface 42 is part of the chipset 16.

The main memory 18 is capable of storing various programs, including operating systems, application software, and device drivers. For the sake of example, the various programs include an application software that is capable of producing an "event" that causes an SMI, a legacy keyboard driver (e.g., a driver for a PS/2 keyboard) and USB controller software.

The BIOS code 34 includes system management code that runs when the processors 12a, 12b are in system management mode ("SMM"), which occurs upon receipt of an SMI. When one of the processors 12a, 12b receives an SMI, such as an event that is "trapped" via an SMI, the processor executes the command, the chipset 16 generates the SMI, and then both of the processors 12a, 12b halt their current operation and jump into SMM. In SMM, the BIOS code 34 can take care of any "tasks" that are required. In order to handle the events correctly, the BIOS must determine the task to be performed. To determine what particular task needs to be performed, the BIOS code 34 must investigates the registers 13a, 13b of the processors 12a, 12b (which are stored in memory 18).

For example, the processors 12a, 12b may trap on accesses to port 60h (and/or 64 h) to emulate legacy hardware keyboards. When a read or write to port 60h occurs, the processors 12a, 12b go into SMM and the BIOS code 34 polls the appropriate registers 13a, 13b. The BIOS uses these registers to determine how to get the operating instruction, or opcode, from memory that was executed and may have caused the SMI trap. If a read to port 60h occurred, the BIOS code 34 provides the keyboard data from the USB keyboard 39 to the appropriate processor's register. If a write to port 60h occurred, the BIOS code 34 retrieves the data from the appropriate register, emulates this same functionality for the USB keyboard 39, and completes the write to port 60h.

Figure 2:
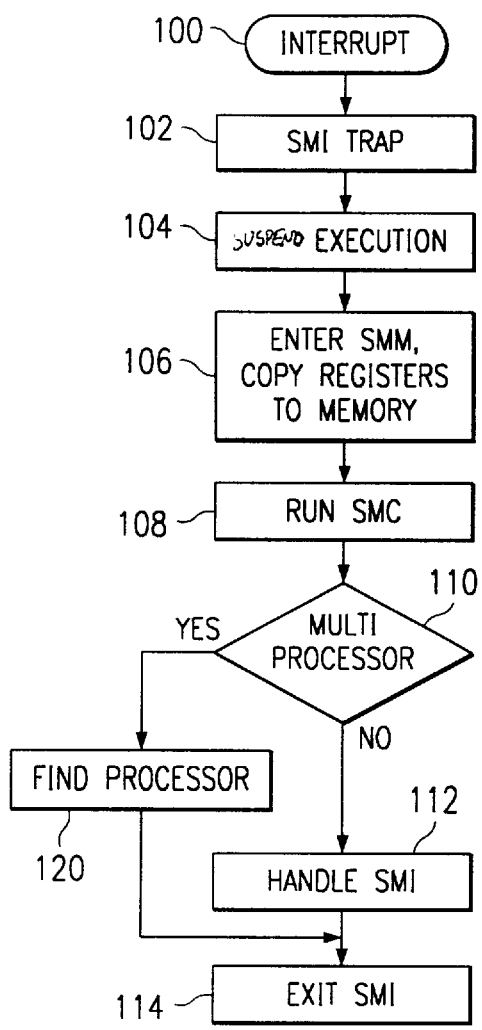
FIG. 2 provides a flow chart of an INTERRUPT routine for controlling the computer of FIG. 1.

Referring also to FIG. 2, in a multiprocessor system such as the computer 10, the BIOS code 34 must know which processor (processor 12a or processor 12b) executed the instruction that caused the SMI so that it can know which group of registers (registers 13a or registers 13b) from which to read or write data. The computer 10 performs an INTERRUPT routine 100 to achieve this functionality.

At step 102, the chipset 16 generates an SMI and at step 104, both processors 12a, 12b suspend execution of any software being performed. At step 106, the processors 12a, 12b begin running in SMM, which is inherent in the processor architectures for handling data on their registers. As part of SMM, the processors 12a, 12b copy the contents of their registers 13a, 13b, respectively, into the main memory 18. At step 108, both processors 12a, 12b begin running BIOS system management code ("SMC").

At step 110, a determination is made as to whether the computer is a single processor or multiprocessor system. It is understood, however, that this determination can be pre-coded, or can be left out entirely if the computer configuration is known at the time of creating the BIOS system management code. If this is a single processor computer, execution proceeds to step 112 where the BIOS system management code handles the SMI interrupt by accessing the registers from the processor that caused the interrupt and handling the task accordingly. At step 114, the processor(s) stop performing in SMM and return to their previous operation.

If at step 110 the computer is a multiprocessor system, such as the computer 10, then execution proceeds to step 120 where the computer performs a FIND PROCESSOR routine. The FIND PROCESSOR routine 120 determines which processor (12a or 12b) caused the SMI.

Figure 3:
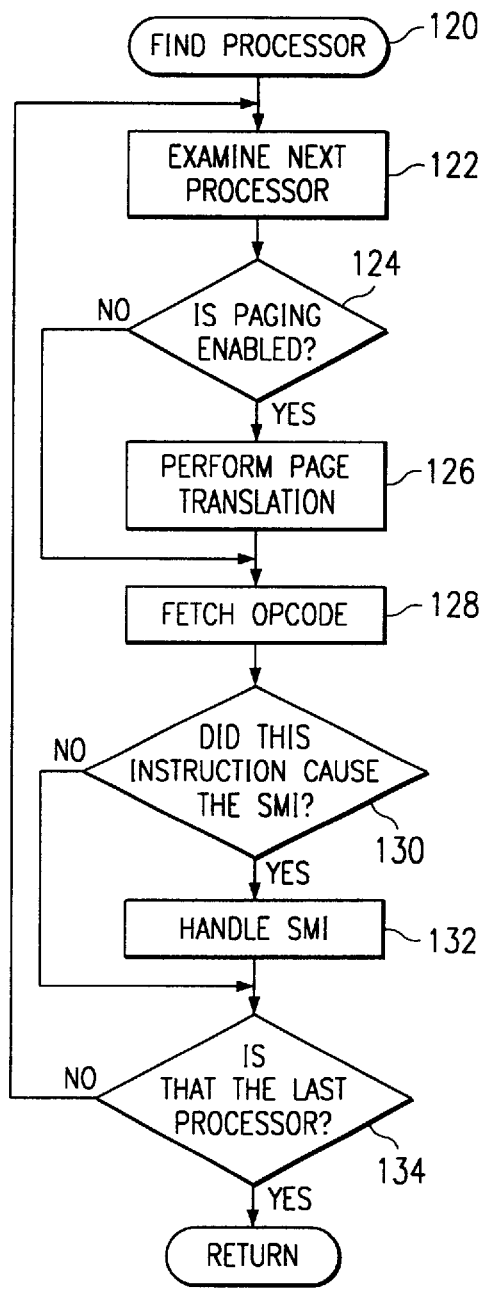
FIG. 3 provides a flow chart of a FIND PROCESSOR routine used by the INTERRUPT routine of FIG. 2.

Referring also to FIG. 3, steps 124–128 of the FIND PROCESSOR routine 120 serve to retrieve the processor's pointer (program counter) to the opcode that was running at the time the interrupt occurred and translate that pointer into an actual physical memory location. These steps must therefore account for different memory mapping techniques.

At step 122, the routine 120 sequentially examines each processor of the computer system and retrieves a program counter to identify where the processor stored its registers. At step 124, the routine determines if address translation (e.g., paging) is enabled. If so, the program counter represents a relative address and at step 126, the routine translates the relative address into an actual address. In one embodiment, the BIOS system management code translates the received data to determine the actual physical location in memory 18 where the registers (13a or 13b) are stored. In the present example, this translation utilizes the processors code segment register and instruction pointer register.

Upon completion of step 126, or upon a negative determination of translation at step 124, execution proceeds to step 128 where the opcode is retrieved. The opcode indicates what kind of memory access was made and the explicit operating instruction being performed immediately before the SMI. At step 130, a determination as to whether the present processor is the one that caused the SMI trap to occur can be made from the opcode.

If the present processor is the one that caused the SMI trap to occur, execution proceeds to step 132 where the BIOS system management code handles the interrupt accordingly. The BIOS can properly handle the interrupt because it now knows which processor caused the interrupt. Once the interrupt has been handled, or upon a negative determination at step 130, execution proceeds to step 134 where a determination is made as to whether any more processors may have caused an SMI. If so, execution returns to step 122. Otherwise, execution returns to step 114 of the INTERRUPT routine 100 (FIG. 2).

It is understood that the source of the SMI may come from many different events. One such event occurs when the computer 10 uses a port 60h/64h trap to emulate a PS/2 keyboard in a non-USB-aware operating environment. In this case, the computers BIOS code 34 intercepts data and software access to and from specific ports associated with a legacy keyboard. The BIOS code determines which processor caused the SMI and moves data between the port (e.g. port 60h or 64h) and the appropriate register.

Another event occurs with advanced configuration power management interface ("ACPI"). In ACPI, the computer 10 uses SMM to do power-related events such as power down, standby or wake-on-LAN. This generates an event that causes the computer 10 to jump into SMM, and the BIOS must check certain values of processors accordingly.

Therefore, although illustrative embodiments have been shown and described, other modifications, changes, and substitutions are intended in the foregoing disclosure. For example, different computer arrangements can also benefit from the foregoing disclosure. Furthermore, different types of interrupts can be supported. Accordingly, it is appropriate that the appended claims be construed broadly and in a manner consistent with the scope of the disclosure.

What is claimed is:

1. A computer system comprising:
   at least two microprocessors, each microprocessor being capable of running in a system management mode and each microprocessor including a respective register, wherein, when any of the microprocessors causes an interrupt, each microprocessor stores its respective register and begins running in system management mode;
   memory for storing system management code and capable of storing each microprocessor register, wherein the system management code includes:
   instructions for locating each register in the memory when the microprocessors are running in system management mode;
   instructions for examining contents of each register to determine which of the processors caused the interrupt;
   instructions for handling the interrupt upon determination of which processor caused the interrupt; and
   a chipset connected between the microprocessors and the memory wherein the chipset instructs each microprocessor to suspend execution, store its respective register, and resume execution in system management mode in response to the interrupt.

2. The computer system of claim 1 wherein the memory includes a main memory component and a basic input/output system component.

3. The computer system of claim 1 including a plurality of processors, wherein the processors are capable of running an operating system that supports multiple processors.

4. The computer system of claim 1 wherein the interrupt is a system management interrupt.

5. The computer system of claim 4 wherein the instructions for examining each register also fetch an opcode indicated by each register and determine if the opcode is of a type that would cause a system management interrupt.

6. The computer system of claim 1 wherein the instructions for locating each register also translate a first address to a second address for each register.

7. In a multiprocessor computer system, a method for handling a system management interrupt comprising:
   a) waiting for the computer to enter system management mode;
   b) selecting a first processor of the multiprocessor computer system;
   c) locating one or more registers and checking for contents of each register of the first processor;
   d) examining the contents to determine if the first processor caused the system management interrupt;
   e) handling the interrupt for the first processor if the first processor did cause the system management interrupt; and
   f) repeating a–e for a next processor of the multiprocessor computer system.

8. The method of claim 7 wherein the repeating is performed regardless of whether a determination was made if the first processor caused the system management interrupt.

9. The method of claim 7 wherein the repeating is performed only if a determination was made that the first processor did not cause the system management interrupt.

10. The method of claim 7 further comprising:
    fetching an opcode indicated by the contents and determining if the opcode is of a type that would cause a system management interrupt.

11. The method of claim 7 further comprising:
    translating a first address to a second address in order to locate an opcode.

12. The method of claim 7 wherein the computer system includes a non-legacy component and is running an operating environment that only supports legacy components.

13. A program for controlling operation of a multiprocessor computer system upon receipt of a system management interrupt, the program comprising:
    a) instructions responsive to the computer system entering a system management mode for selecting a first processor of the multiprocessor computer system;
    b) instructions for locating a register and checking for contents of the register of the first processor;
    c) instructions for examining the contents to determine if the first processor caused the system management interrupt;
    d) instructions for handling the interrupt for the first processor if the first processor did cause the system management interrupt; and
    e) instructions for repeating a–d for a next processor of the multiprocessor computer system regardless of whether a determination was made if the first processor caused the system management interrupt.

14. The program of claim 13 further comprising:
    instructions for fetching an opcode indicated by the contents; and
    instructions for determining if the opcode is of a type that would cause a system management interrupt.

15. The program of claim 13 further comprising:
    instructions for translating a first address to a second address in order to locate the contents of the first processor's register.

16. The program of claim 13 wherein the system management interrupt is caused by an operation to a port.

17. A program for controlling operation of a multiprocessor computer system upon receipt of a system management interrupt, the program comprising:

a) instructions responsive to the computer system entering a system management mode for selecting a first processor of the multiprocessor computer system;

b) instructions for locating a register and checking for contents of the register of the first processor;

c) instructions for examining the contents to determine if the first processor caused the system management interrupt;

d) instructions for handling the interrupt for the first processor if the first processor did cause the system management interrupt; and e) instructions for repeating a-d for a next processor of the multiprocessor computer system only if it was a determination was made that the first processor did not cause the system management interrupt.

\* \* \* \* \*